US012561877B2

(12) United States Patent
Hejl, Jr.

(10) Patent No.: US 12,561,877 B2
(45) Date of Patent: Feb. 24, 2026

(54) MOTION CAPTURE USING LIGHT POLARIZATION

(71) Applicant: Electronic Arts Inc., Redwood City, CA (US)

(72) Inventor: James Nunn Hejl, Jr., Austin, TX (US)

(73) Assignee: Electronic Arts Inc., Redwood City, CA (US)

( * ) Notice: Subject to any disclaimer, the term of this patent is extended or adjusted under 35 U.S.C. 154(b) by 353 days.

(21) Appl. No.: 18/128,292

(22) Filed: Mar. 30, 2023

(65) Prior Publication Data
US 2023/0351660 A1 Nov. 2, 2023

Related U.S. Application Data

(60) Provisional application No. 63/363,985, filed on May 2, 2022.

(51) Int. Cl.
 *G06T 13/40* (2011.01)
 *G06T 7/73* (2017.01)
(52) U.S. Cl.
 CPC .............. *G06T 13/40* (2013.01); *G06T 7/73* (2017.01); *G06T 2207/30204* (2013.01)

(58) Field of Classification Search
 CPC ..................................................... G06T 13/40
 See application file for complete search history.

(56) References Cited

U.S. PATENT DOCUMENTS

| | | | |
|---|---|---|---|
| 2006/0192854 A1* | 8/2006 | Perlman ................. | G01S 7/499 |
| | | | 348/154 |
| 2008/0118143 A1* | 5/2008 | Gordon ................... | G06T 7/521 |
| | | | 382/154 |
| 2022/0083125 A1* | 3/2022 | Lefaudeux ............... | G06N 5/04 |

* cited by examiner

*Primary Examiner* — Shivang I Patel
(74) *Attorney, Agent, or Firm* — Lee & Hayes, P.C.

(57) ABSTRACT

A system may perform motion capture using polarized light. For example, the system may determine one or more filtered pixels having an associated degree of linear polarization above a threshold from a plurality of pixels of an image captured by a polarization camera and determine a set of pixels of the filtered pixels are associated with a polarized tag, the polarized tag being on a subject of motion capture. The system may then determine an orientation of the polarized tag based on one or more angles of polarization of the pixels associated with the polarized tag and generate a motion capture pose for a model based on a location of the set of pixels of the filtered pixels in the image and the orientation of the polarized tag.

20 Claims, 6 Drawing Sheets

DEGREE OF LINEAR POLARIZATION FILTERING OF CAPTURED IMAGE 402

PIXELS REPRESENTING POLARIZED TAGS 404

SKELETAL MAPPING TO POLARIZED TAG LOCATIONS 406

600 ⌐

PROCESSOR(S) 604

NETWORK INTERFACE(S) 608

INPUT/OUTPUT INTERFACE(S) 606

STORAGE INTERFACE(S) 610

COMPUTER-READABLE MEDIA 612

POLARIZATION CAMERA MODULE 614

MOTION CAPTURE MODULE 616

IMAGE CAPTURE DATASTORE 618

POSE DATASTORE 620

COMPUTING DEVICE(S) 602

MOTION CAPTURE USING LIGHT POLARIZATION

CROSS-REFERENCE TO RELATED APPLICATION(S)

This application claims priority to U.S. Provisional Application No. 63/363,985, filed on May 2, 2022 and entitled "MOTION CAPTURE USING LIGHT POLARIZATION," the entirety of which is incorporated herein by reference.

BACKGROUND

In rendering, a character (used herein to also include other articulated objects) may be animated using skeletal animation. Skeletal animation may be produced based on motion captures of a subject (e.g., a person or animal). Producing motion captures of entities and then producing skeletal animations based thereon may require special settings or conditions which may be time consuming, expensive and/or otherwise burdensome.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
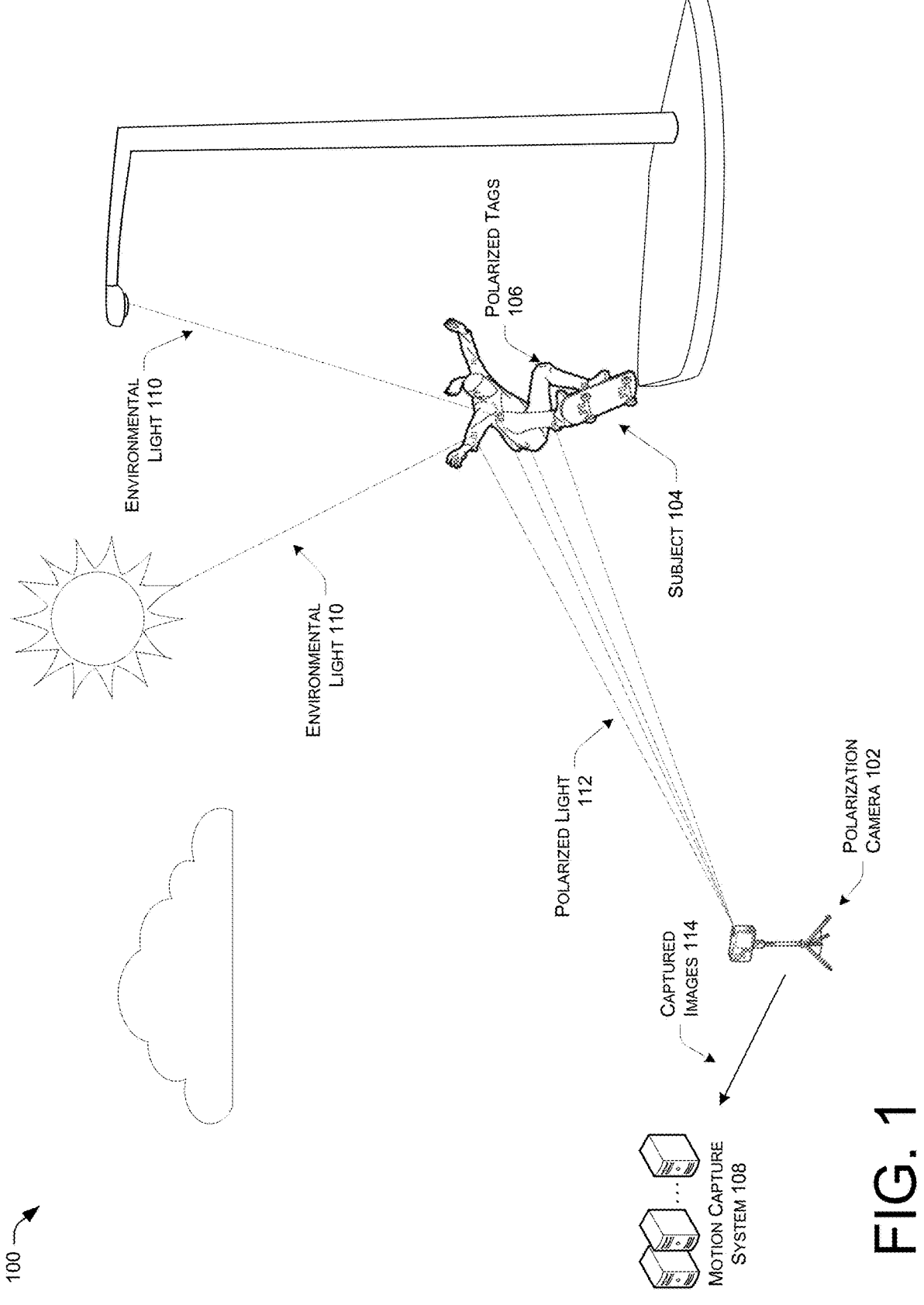
FIG. 1 illustrates an environment including a polarization camera that may capture images of a subject for a motion capture system, in accordance with example embodiments of the disclosure.

Example embodiments of this disclosure describe methods, apparatuses, computer-readable media, and system(s) that may utilize polarized light to perform motion capture.

Generally, motion capture may use cameras to capture the movement of a subject (e.g., an actor or object). In some examples, movement data may be generated based on tracking markers affixed to the subject. The markers may be placed on joint axes and/or rigid or bony landmarks. The markers can be associated with respective portions of a skeleton or structure of a simulated version of the subject (e.g., a simulated character or object). The data associated with the tracking markers for a given point in time may be utilized to generate a pose for a skeleton or structure of the simulated version of the subject. Changes in the pose of the skeleton or structure of the simulated version of the subject over time may be used to control the movements of a simulated version of the subject. As an example, based upon the motion captured position of markers associated with the human skeleton at a certain time instance, e.g. a specific frame, a computer model of the human may be posed in the same position.

Some examples according to this disclosure may perform motion capture based on images captured by a polarization camera. More particularly, the captured images may include polarization characteristics of the light captured to generate the captured images (e.g., intensity, degree of linear polarization, angle of polarization, etc.). Examples may further utilize polarized tags affixed to, or otherwise on, the subject as tracking markers. The polarized tags may reflect polarized light when exposed to environmental light (e.g., which may be uncontrolled and unpolarized).

The pixels of an image captured by the polarization camera may be filtered based on the degree of linear polarization of the captured light associated with the pixels. The filtered pixels may be utilized to determine pixels of the image associated with polarized tags. A motion capture pose may be generated based on the identified polarized tags in the captured image.

In some examples, individual polarized tags may include multiple portions that reflect polarized light with distinct polarization characteristics. For example, a polarized tag may include three portions with known respective linear polarizations (e.g., a 90° portion, a 45° portion and a 0° portion). Some examples may further analyze the filtered pixels associated with the polarized tags (e.g., the pixels identified based on the degree of linear polarization). For example, based on the known arrangement of respective linear polarizations of the portions of the polarized tag and the angle of polarization of the groups of pixels associated with the polarized tag, some examples may determine an orientation of the polarized tag. Some examples may utilize the orientation of the polarized tags in determining the orientation of one or more associated portions of the skeleton or structure of a simulated version of the subject.

Further, in some examples, the polarized tags may include respective identifiers that may identify or distinguish the polarized tag among the other polarized tags affixed to the subject. For example, an alphanumeric or encoded identifier may be formed by creating gaps in the portion(s) of the polarized tag that reflect polarized light (e.g., e.g., by creating dark or blank areas among the pixels with above the threshold degree of linear polarization). Some examples may utilize the identification of the polarized tags in determining the polarized tag is associated with a respective portion of the skeleton or structure of a simulated version of the subject (e.g., the associated joint or landmark).

The techniques and systems discussed herein may provide improvements to motion capture. Generally, motion capture has required controlled lighting which has constrained the settings and conditions in which motion capture may be performed and required motion capture systems to provide or emit the specialized light. The techniques and systems discussed herein may allow for motion capture in environments without controlled lighting. This may further eliminate the need for the system to emit energy (e.g., specialized or controlled lighting) for reflection to the camera. This may further reduce issues occurring in systems relying on emission of energy (e.g., specialized or controlled lighting) for reflection to the camera such as bloom. Further, the techniques and systems may reduce the computational requirements and probability of error in determining the orientation of the portion of the skeleton or structure of the simulated version of the subject (e.g., the associated joint or land-mark). Moreover, the techniques and systems may reduce the probability of error in determining tracking markers from other objects in an environment over systems that utilize intensity of refection. For example, in systems that utilize infrared (IR) light reflection intensity to find IR reflective tracking markers, the surrounding surfaces also reflect IR back into the camera such that other overly reflective objects (e.g., a human eyeball) can be mistaken for a marker. The techniques and systems discussed herein may utilize polarization characteristics (e.g., degree of linear polarization, angle of polarization, etc.) to determine the polarized tags, which are unlikely to occur in natural background objects. These and other improvements to motion capture are discussed herein.

Certain implementations and embodiments of the disclosure will now be described more fully below with reference to the accompanying figures, in which various aspects are shown. However, the various aspects may be implemented in many different forms and should not be construed as limited to the implementations set forth herein. For example, while examples discussed herein may utilize a single polarization camera, other examples may utilize multiple cameras. In addition, while discussed primarily herein in the context of a human subject, other examples may relate to the motion capture of other entities or object (e.g., an animal or machine model) and/or may relate to another portion of the model or the entire model. Moreover, embodiments may vary and are not limited in the computing devices or processors that may perform operations to perform motion capture and animations based thereon. It will be appreciated that the disclosure encompasses other variations of the embodiments, as described herein. Like numbers refer to like elements throughout.

FIG. 1 illustrates an environment 100 including a polarization camera 102 that may capture images of a subject 104 for a motion capture system 108, in accordance with example embodiments of the disclosure. The polarization camera 102 may capture images including polarization characteristics of the light captured to generate the captured images. In addition, the environment 100 may further include polarized tags 106 affixed to the subject as tracking markers. For example, polarized tags 106 of one or more sizes may be attached to, or otherwise positioned on the surface of, various portions of the body of the subject (e.g., face, hands, arms, legs, feet, torso, etc.).

In operation, the subject 104 may perform motions to be captured in the field of view of the polarization camera 102. Environmental light 110 may be polarized by reflection from the polarized tags 106 into polarized light 112. As discussed above, prior to being reflected, the environmental light 110 may be uncontrolled, natural, unpolarized or otherwise non-specialized light (e.g., with the caveat that at least a portion of the environmental light 110 be of a type that is reflected by the polarized tags 106 in a form of polarized light 112 that is detectable by the polarization camera 102). Implementations are not limited to natural light. For example, in dark conditions, environmental light 110 may be supplemented by light from additional sources which may also be uncontrolled, unpolarized or otherwise non-specialized light. Further, the environmental light 110 and polarized light 112 may vary in wavelength depending on the implementation (e.g., visible, infrared, etc.).

The polarized light 112 resulting from the reflection of environmental light 110 from the polarized tags 106 may have polarization characteristics associated with the particular polarized tag 106 or portion of the polarized tag 106 from which the polarized light 112 was reflected.

Figure 2:
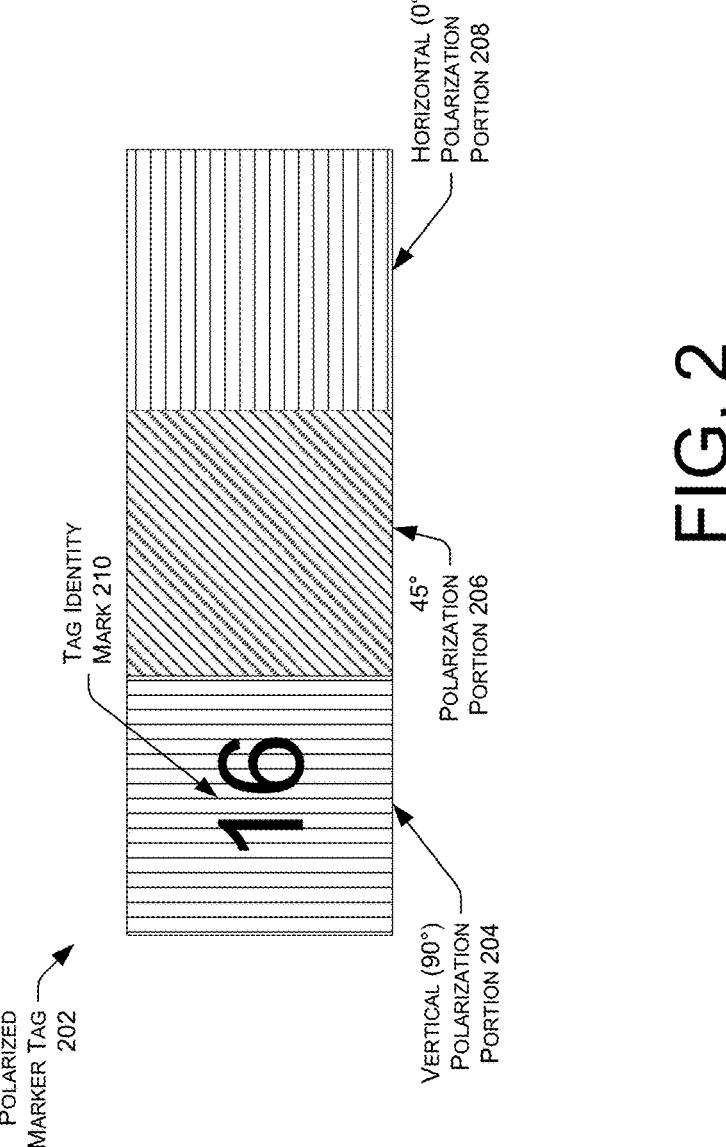
FIG. 2 illustrates a schematic diagram of an example polarized tag, in accordance with example embodiments of the disclosure.
Figure 2:

FIG. 2 illustrates a schematic diagram 200 of an example polarized tag 202, in accordance with example embodiments of the disclosure. As discussed above, the polarized tag 202 includes multiple portions that reflect polarized light with distinct polarization characteristics. More particularly, the polarized tag 202 includes three portions with respective linear polarizations, namely a vertical (90°) polarization portion 204, a 45° polarization portion 206 and a horizontal (0°) polarization portion 208. In some examples, the distinct polarization characteristics of the portions of the polarized tag 202 may allow for determination of the orientation of the polarized tag by the motion capture system 108. The illustrated angles of polarizations and their distribution are exemplary and other or additional variations in polarization characteristics may be utilized in examples according to this disclosure.

Further, the polarized tag 202 includes a tag identity mark 210 that may identify the polarized tag 202 from among the other polarized tags 106 affixed to the subject. As illustrated, the tag identity mark 210 may be an alphanumeric or encoded identifier formed by creating gaps in the portion(s) of the polarized tag 202 that reflect polarized light. The lack of polarized light being reflected by the areas including the gaps may allow subsequent processing by the motion capture system 108 to recognize the tag identity mark 210 (e.g., by creating dark or blank areas among the pixels with above the threshold degree of linear polarization). Of course, the tag identity mark 210 is not limiting and other forms of identity marks may be utilized. For example, some tag identity marks may take the form of barcodes or other encoded identifier such as QR codes.

Examples according to this disclosure are not limited to polarized tags of the shape, form or pattern of polarization characteristics illustrated in FIGS. 1-4. For example, polarized tags may be formed of any material that may generate a polarization signature (e.g., a high degree of polarization, a high degree of linear polarization, distinct angles of polarizations, etc.). In some examples, the polarized tags may be invisible to the eye or visible light sensors and/or integrated into clothing or other portions of the subject. For example, the polarized tags may be integrated into various locations on a sports uniform (e.g., an NFL Jerseys), hidden on an actor, hidden on cars in F1 (e.g., integrated into the paint or signage of the car) and so on. Further, the portions of the polarized tags with distinct polarization characteristics may be contiguous or distributed over an area of the subject (e.g., in a pattern or distribution).

Moreover, in some examples, the orientation information determined from distinct polarization characteristics of different portions of a particular polarized tag may alternatively or additionally be determined from distinct polarization characteristics of different polarized tags with known positional and orientation relationships. For example, a polarized tag affixed to an actor's lower arm above the wrist and another polarized tag affixed to an actor's lower arm below the elbow may have a known distance between and a known difference in angle of polarization. Using the locations of the tags and the tag identity marks of the polarized tags or a third polarized tag located between the first and second polarized tag with a third angle of polarization, the orientation of the lower arm may be identified with greater confidence than would be allowed by algorithms that track markers from frame to frame. For example, algorithms that track markers from frame to frame may confuse markers that intersect in the frame to frame tracking while examples using tag identity marks or known distributions of distinct polarization characteristics may use the additional information to maintain tracking. Other variations and benefits would be apparent to one of ordinary skill in the art in view of this disclosure.

Returning to FIG. 1, the polarization camera 102 may capture light of various polarizations including the polarized light 112 reflected from the polarized tags 106 and store image data based on the captured polarized light 112. More particularly, the captured images 114 may include polarization characteristics of the light captured to generate the captured images 114.

Figure 3:
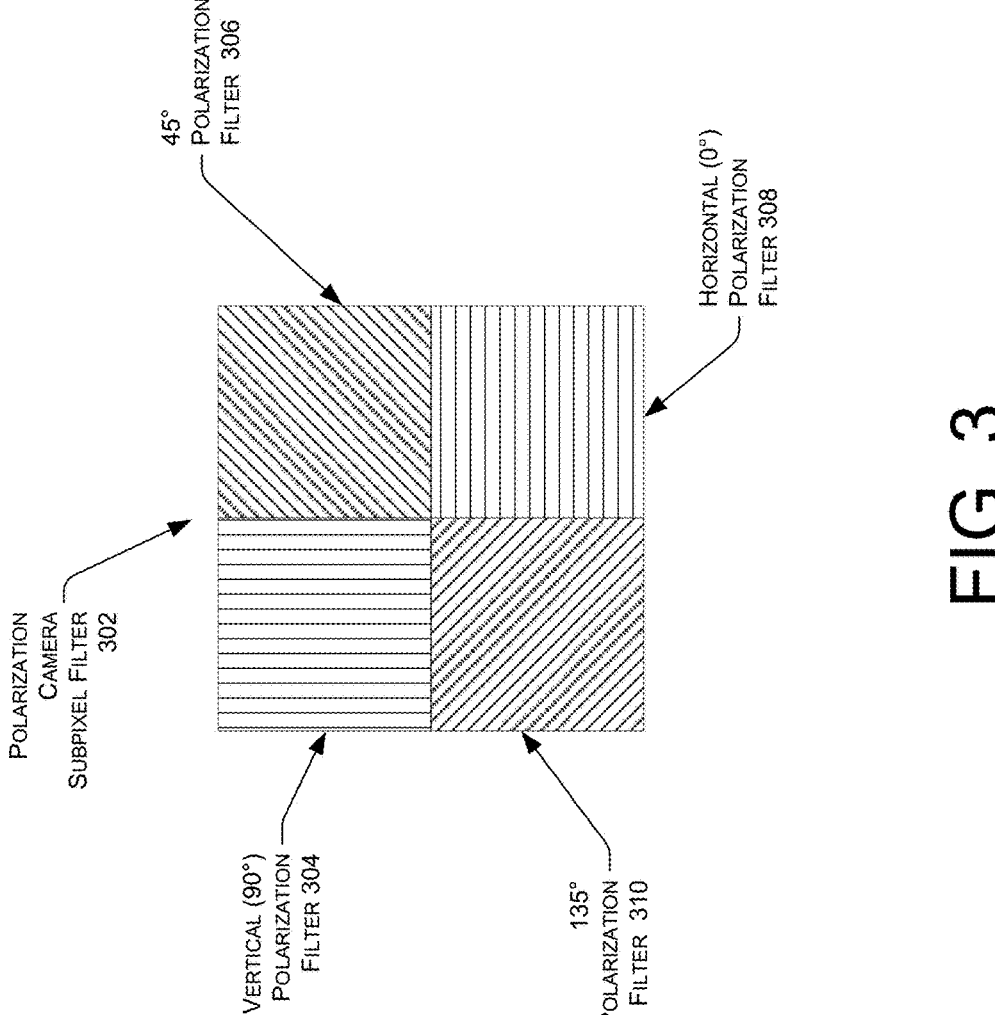
FIG. 3 illustrates a schematic diagram of an example polarization camera subpixel filter of a polarization camera, in accordance with example embodiments of the disclosure.

FIG. 3 illustrates a schematic diagram 300 of an example polarization camera subpixel filter 302 of a polarization camera, in accordance with example embodiments of the disclosure. As illustrated, the polarization camera subpixel filter 302 may be associated with a pixel of the polarization camera sensor that includes four subpixels. More particularly, the polarization camera subpixel filter 302 may include a vertical (90°) polarization filter 304, a 45° polarization filter 306, a horizontal (0°) polarization filter 308, and a 135° polarization filter 310. Each of the filters 304-310 may be associated with (e.g., filter the light received by) a subpixel of the pixel associated with the polarization camera subpixel filter 302. While the example arrangement illustrated in FIG. 3 relates to a monochromatic polarization camera, examples according to this disclosure are not so limited. For example, the filter arrangement illustrated in FIG. 3 may be utilized in a color polarization camera. For example, a color polarization camera may include pixels that comprise four color subpixels (e.g., R, G, G, B subpixels) that each include four polarization sub-subpixel. The polarization sub-subpixel may each be associated with a polarization camera subpixel filter similar to polarization camera subpixel filter 302 such that each full pixel sensor of the color polarization camera is associated with four polarization camera subpixel filters similar to polarization camera subpixel filter 302. Of course, the arrangement illustrated and discussed with respect to FIG. 3 is merely an example and other example variations would be apparent in view of this disclosure.

Returning to FIG. 1, the polarization camera 102 may generate intensity data for the intensities detected at each sub-pixel (or sub-subpixel) of the camera sensor and provide the intensity data to the motion capture system 108 as captured images 114. Additionally or alternatively, the polarization camera 102 may perform additional processing on the intensity data and generate captured images based thereon. For example, the polarization camera 102 may determine the Stokes parameters of the captured light associated with the individual pixels, then determine the degree of linear polarization and/or angle of polarization for the individual pixels based on the Stokes parameters. In such an example, the captured images 114 may include the degree of linear polarization and/or angle of polarization data for each pixel (e.g., some examples may further include the intensity data).

The motion capture system 108 may receive the captured images 114 from the polarization camera 102. In examples in which the polarization camera 102 provides the intensity data to the motion capture system 108 as captured images 114, the motion capture system 108 may perform the processing to determine the degree of linear polarization and/or angle of polarization data for each pixel.

The motion capture system 108 may operate to filter the pixels of the capture images 114 based on the degree of linear polarization of the captured light 112 associated with the pixels (e.g., determined from polarization characteristics). The filtered pixels may be utilized to determine pixels of the image associated with polarized tags. A motion capture pose may be generated based on the identified polarized tags in the captured image.

Figure 4:
FIG. 4 illustrates an example of determining a motion capture pose using polarization characteristics of pixels of a captured image of a motion capture subject, in accordance with example embodiments of the disclosure.
Figure 4:
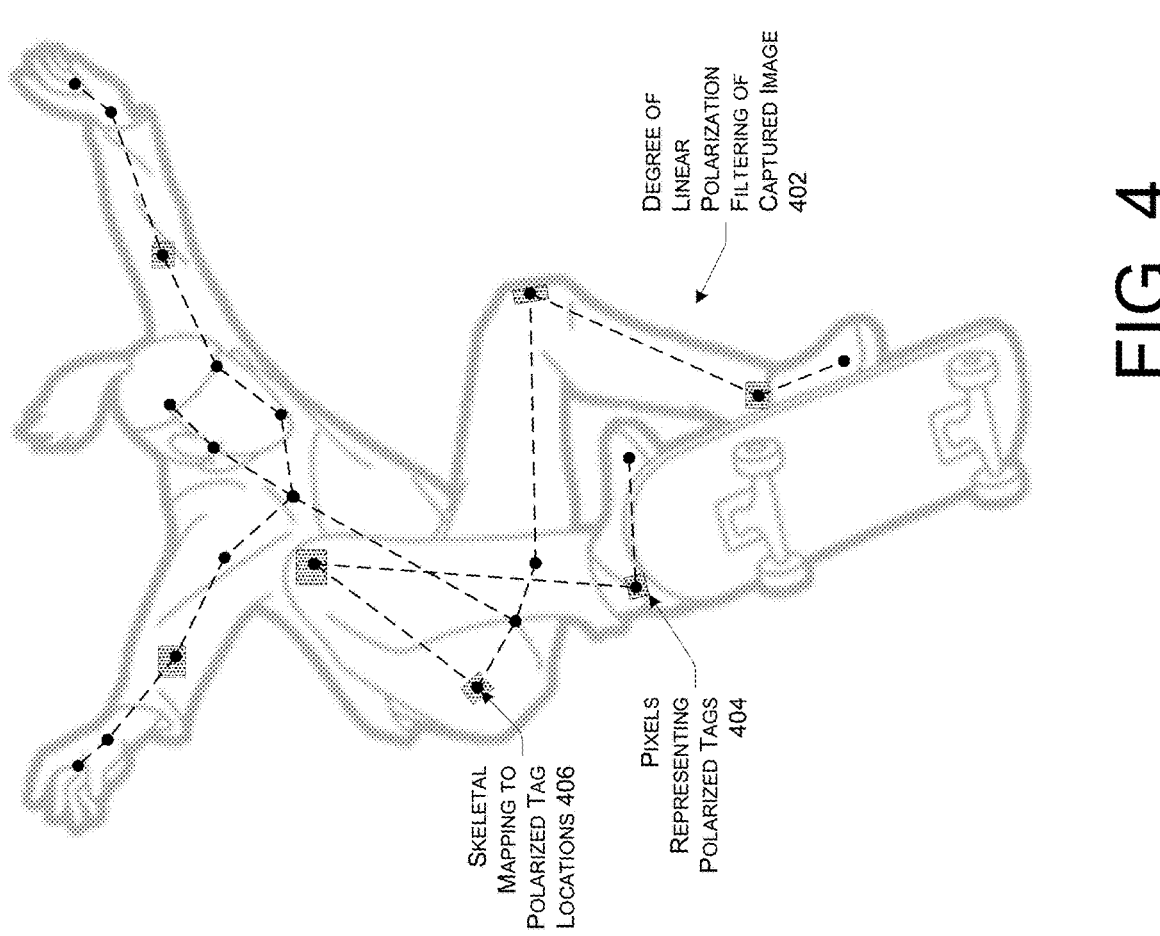

FIG. 4 illustrates an example 400 of determining a motion capture pose using polarization characteristics of pixels of a captured image of a motion capture subject, in accordance with example embodiments of the disclosure. More particularly, the captured image 114 illustrated in FIG. 4 include the degree of linear polarization and/or angle of polarization data for each pixel. The visual image of the subject is overlaid to ease understanding of the FIG.

As discussed above, the example 400 represents a degree of linear polarization filtering of the pixels 402 such that the pixels representing polarized tags 404 are shown while pixels not corresponding to polarized tags may be filtered out (e.g., due to having less than a threshold degree of linear polarization). As discussed above, the pixels representing polarized tags 404 may be utilized to determine a motion capture pose (e.g., a skeletal mapping to the polarized tag locations 406).

The determination of the motion capture pose from pixels determined to correspond to polarized tags may be performed using techniques that would be understood by one of ordinary skill in the art in view of this disclosure. Further, in examples utilizing multiple polarization cameras, the determination of the motion capture pose may be performed using techniques that would be understood by one of ordinary skill in the art in view of this disclosure for combining the position information from images captured by the multiple cameras to determine the location of the polarized tags in the environment. In addition or alternatively, the determination of the motion capture pose from pixels determined to correspond to polarized tags may be performed based on additional information (e.g., angle of polarization and/or polarized tag identifiers).

For example, the motion capture system 108 may further analyze the filtered pixels associated with the polarized tags 106 (e.g., the pixels identified based on the degree of linear polarization filtering) to determine groups of pixels associated with the same identified tag sharing a linear polarization (e.g., a shared angle of polarization). In the prior example, the pixels associated with a tag may be sorted into three groups, one associated with the 90° portion, one associated with the 45° portion and one associated with the 0° portion. Based on the known arrangement of respective linear polarizations of the portions of the polarized tag and the angle of polarization of the groups of pixels associated with the polarized tag, some examples may determine an orientation of the polarized tag. Some examples may utilize the orientation of the polarized tags in determining the orientation of one or more associated portions of the skeleton or structure of a simulated version of the subject.

Some examples may additionally or alternatively utilize the identification of the polarized tags in determining the polarized tag is associated with a respective portion of the skeleton or structure of a simulated version of the subject (e.g., the associated joint or landmark).

Figure 5:
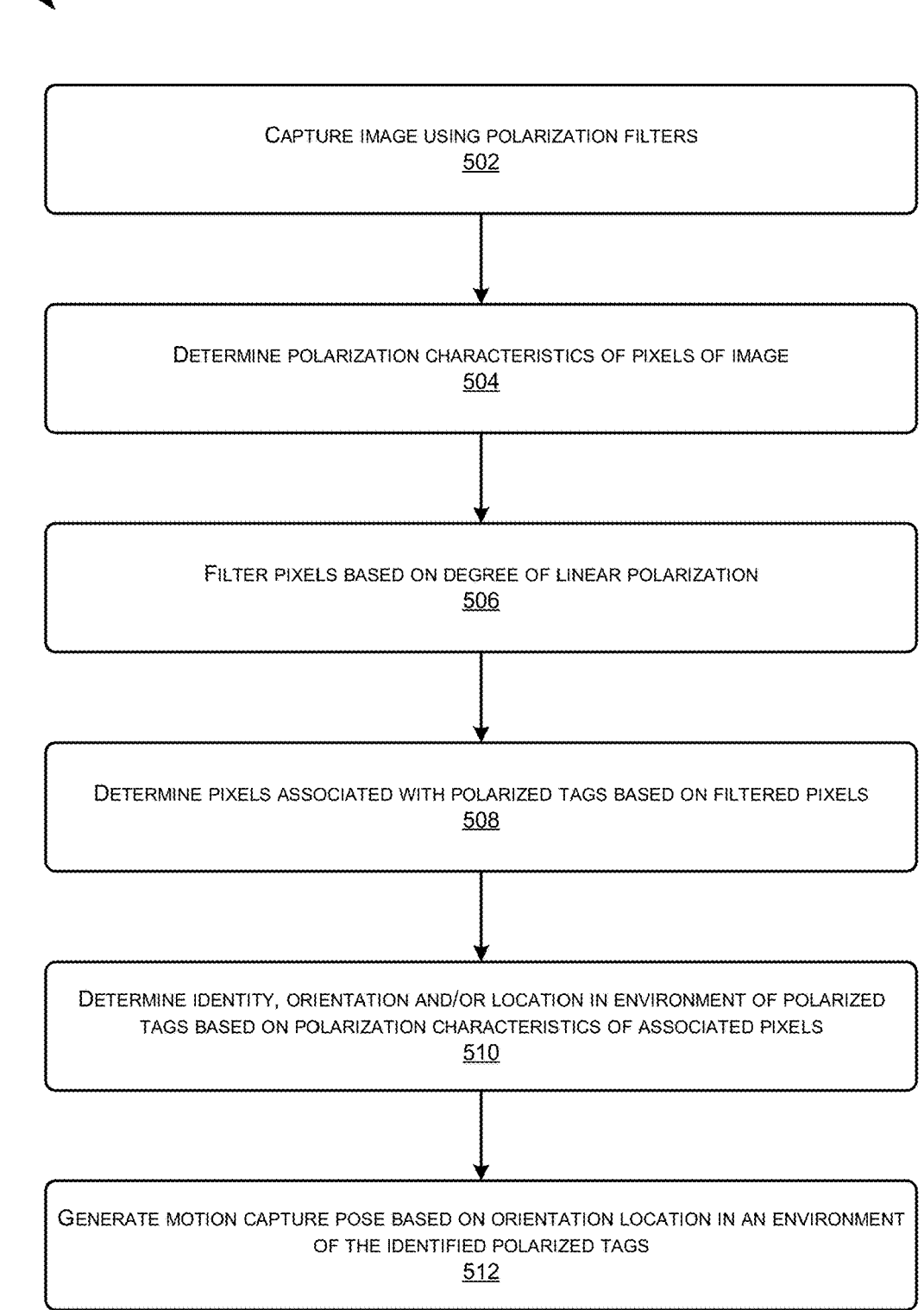
FIG. 5 illustrates a flow diagram of an example method for performing motion capture using polarized light.

FIG. 5 illustrates a flow diagram of an example method 500 for performing motion capture using polarized light, in accordance with example embodiments of the disclosure. The method 500 may be performed by the system of FIG. 1 as discussed above.

At block 502, the polarization camera 102 may capture image(s) using polarization filters. At block 504, the polarization camera 102 may the determine polarization characteristics of pixels of an image. For example, the polarization camera may determine the degree of linear polarization and/or angle of polarization data for each pixel of the captured images.

Next, at block 506, the motion capture system 108 may filter the pixels of the captured image based on the degree of linear polarization of the pixels. At block 508, the motion capture system 108 may determine pixels associated with polarized tags based on filtered pixels. The motion capture system 108 may then determine the identity, orientation and/or location in the environment of the polarized tags based on polarization characteristics of associated pixels and other information at 510 (e.g., as discussed above with respect to FIGS. 1-4). Then, at block 512, the motion capture system 108 may generate a motion capture pose based on the orientation, location, and other information of the identified polarized tags.

Following block 512, the system may output the motion capture pose for use in animation and the process may repeat for new captured images.

It should be noted that some of the operations of method 500 may be performed out of the order presented, with additional elements, and/or without some elements. Some of the operations of method 500 may further take place substantially concurrently and, therefore, may conclude in an order different from the order of operations shown above. Further, implementations are not limited to the details of the above examples and variations are possible. Moreover, while the implementations discussed above may perform motion capture of a particular subject for a respective model, implementations are not so limited. For example, some implementations may perform motion capture for multiple subjects or objects. In some examples, other objects such as a skateboard, batt or a ball may be subject to motion capture by including polarized tags on the other objects which may include identifiers associated with the object. This may allow for motion capture of combinations of subject(s) and/or object(s), potentially in conjunction, by separating polarized tags by subject or object and performing motion capture for each subject or object as discussed above, then combining the captured motion of the subject(s) and/or object(s).

Figure 6:
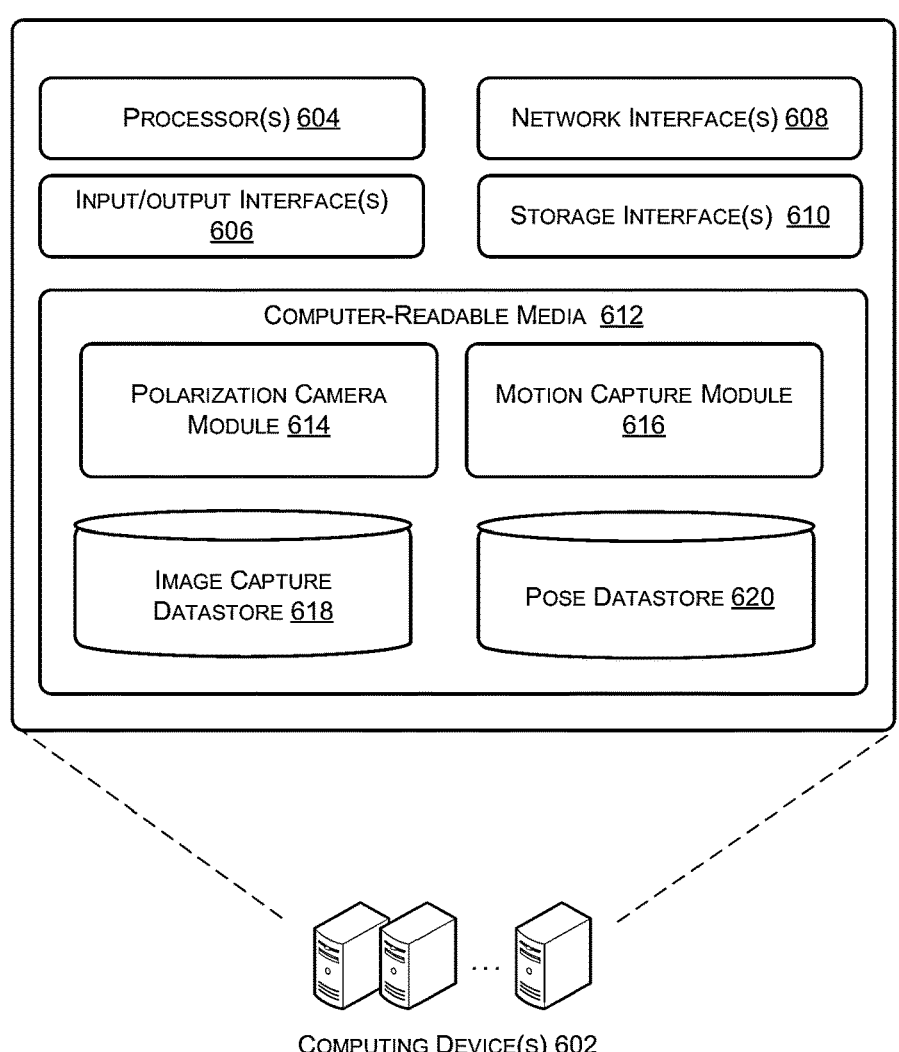
FIG. 6 illustrates a block diagram of an example system including one or more computing device(s) that may perform motion capture using polarized light, in accordance with example embodiments of the disclosure.

FIG. 6 illustrates a block diagram of an example system 600 including one or more computing device(s) 602 that may perform motion capture using polarized light, in accordance with example embodiments of the disclosure. The computing device(s) 602 may include one or more processor(s) 604, one or more input/output (I/O) interface(s) 606, one or more network interface(s) 608, one or more storage interface(s) 610, and computer-readable media 612.

In some implementations, the processors(s) 604 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 604 may possess its own local memory, which also may store program modules, program data, and/or one or more operating system(s). The one or more processor(s) 604 may include one or more cores.

The one or more input/output (I/O) interface(s) 606 may enable a user to interact with a user interface module (e.g., to provide input to and receive output from a user application operating on the system 600). The I/O interface(s) 606 may include a combination of hardware, software, and/or firmware and may include software drivers for enabling the operation of any variety of I/O device(s) integrated on the system 600 or with which the system 600 interacts, such as displays, microphones, speakers, cameras, switches, and any other variety of sensors, or the like.

The network interface(s) 608 may enable the system(s) 600 to communicate via the one or more network(s). The network interface(s) 608 may include a combination of hardware, software, and/or firmware and may include software drivers for enabling any variety of protocol-based communications, and any variety of wireline and/or wireless ports/antennas. For example, the network interface(s) 608 may comprise one or more of a cellular radio, a wireless (e.g., IEEE 802.1x-based) interface, a Bluetooth® interface, and the like. In some embodiments, the network interface(s) 608 may include radio frequency (RF) circuitry that allows the system(s) 600 to transition between various standards. The network interface(s) 608 may further enable the system(s) 600 to communicate over circuit-switch domains and/or packet-switch domains.

The storage interface(s) 610 may enable the processor(s) 604 to interface and exchange data with the computer-readable media 612, as well as any storage device(s) external to the system(s) 600, such as the polarization camera 102.

The computer-readable media 612 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 612 may be implemented as computer-readable storage media (CRSM), which may be any available physical media accessible by the processor(s) 604 to execute instructions stored on the computer-readable media 612. In one basic implementation, CRSM may include RAM and Flash memory. In other implementations, CRSM may include, but is not limited to, ROM, EEPROM, or any other tangible medium which can be used to store the desired information and which can be accessed by the processor(s) 604. The computer-readable media 612 may have an operating system (OS) and/or a variety of suitable applications stored thereon. The OS, when executed by the processor(s) 604 may enable management of hardware and/or software resources of the system(s) 600.

Several functional blocks having instruction, data stores, and so forth may be stored within the computer-readable media 612 and configured to execute on the processor(s) 604. The computer-readable media 612 may have stored thereon the polarized tag capture module 614, the skeletal pose generation module 616, the image capture datastore 618, and the skeletal pose datastore 620. It will be appreciated that each of the functional blocks may have instructions stored thereon that when executed by the processor(s)

604 may enable various functions pertaining to the operations of the system(s) 600. For example, the polarized tag capture module 614 may operate to identify pixels representing polarized tags and/or the orientation and identifier of the polarized tags from image data that includes polarization characteristics information. For example, the image data that includes polarization characteristics information may be stored in the image capture datastore 618. The skeletal pose generation module 616 may operate to determine a skeletal pose for a computer model based on the identification of pixels representing polarized tags and/or the orientation and identifiers of the polarized tags as discussed above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:

one or more processors; and one or more computer-readable media storing computer-executable instructions that, when executed by the one or more processors, cause the one or more processors to:

determine one or more filtered pixels having an associated degree of linear polarization above a threshold from a plurality of pixels of an image captured by a polarization camera;

determine a set of pixels of the one or more filtered pixels is associated with a polarized tag, the polarized tag being on a subject of motion capture;

determine an orientation of the polarized tag based at least in part on one or more angles of polarization of the set of pixels associated with the polarized tag; and generate a motion capture pose for a model based at least in part on a location of the set of pixels of the one or more filtered pixels in the image and the orientation of the polarized tag.

2. The system of claim 1, wherein determining the orientation of the polarized tag comprises:

determining a first angle of polarization of a first set of pixels of the set of pixels associated with a first portion of the polarized tag;

determining a second angle of polarization of a second set of pixels of the set of pixels associated with a second portion of the polarized tag; and determining the orientation of the polarized tag based at least in part on a position of the first set of pixels with respect to the second set of pixels.

3. The system of claim 1, wherein the polarized tag is a first polarized tag, the set of pixels is a first set of pixels, and the computer-executable instructions further cause the one or more processors to:

determine a second set of pixels of the one or more filtered pixels is associated with a second polarized tag, the second polarized tag being on the subject of the motion capture, wherein:

the generating the motion capture pose for the model is further based at least in part on a second location of the second set of pixels of the one or more filtered pixels in the image.

4. The system of claim 3, wherein:

the generating the motion capture pose for the model is further based at least in part on:

a first mapping of the first polarized tag with a first portion of a skeleton of the model; and a second mapping of the second polarized tag with a second portion of the skeleton of the model.

5. The system of claim 1, wherein the computer-executable instructions further cause the one or more processors to:

determine an identifier of the polarized tag based at least in part on the set of pixels of the one or more filtered pixels; and determine, based at least in part on the identifier and the location of the set of pixels of the one or more filtered pixels in the image, a location of a portion of a skeleton of the model, wherein:

the generating the motion capture pose for the model is further based at least in part on the location of the portion of the skeleton of the model.

6. The system of claim 1, wherein the computer-executable instructions further cause the one or more processors to:

determine an orientation of a portion of a skeleton of the model based at least in part on a mapping between the orientation of the polarized tag and the portion of the skeleton; and wherein the generating the motion capture pose is further based at least in part on the orientation of the portion of the skeleton.

7. The system of claim 1, wherein the polarized tag includes a first portion having a first linear polarization, a second portion having a second linear polarization, and a third portion having a third linear polarization, each of the first linear polarization, the second linear polarization, and the third linear polarization being associated with a different angle.

8. The system of claim 7, wherein the first linear polarization includes a 90 degree polarization, the second linear polarization includes a 45 degree polarization angel, and the third linear polarization includes a 0 degree polarization angel.

9. One or more non-transitory computer-readable media storing computer-executable instructions that, when executed by one or more processors, cause the one or more processors to perform operations comprising:

determining one or more filtered pixels having an associated degree of linear polarization above a threshold from a plurality of pixels of an image captured by a polarization camera;

determining a set of pixels of the one or more filtered pixels is associated with a polarized tag, the polarized tag being on a subject of motion capture;

determining an orientation of the polarized tag based at least in part on one or more angles of polarization of the set of pixels associated with the polarized tag; and generating a motion capture pose for a model based at least in part on a location of the set of pixels of the one or more filtered pixels in the image and the orientation of the polarized tag.

10. The one or more non-transitory computer-readable media of claim 9, wherein determining the orientation of the polarized tag comprises:

determining a first angle of polarization of a first set of pixels of the set of pixels associated with a first portion of the polarized tag;

determining a second angle of polarization of a second set of pixels of the set of pixels associated with a second portion of the polarized tag; and determining the orientation of the polarized tag based at least in part on a position of the first set of pixels with respect to the second set of pixels.

11. The one or more non-transitory computer-readable media of claim 9, wherein the polarized tag is a first polarized tag, the set of pixels is a first set of pixels, and the operations further comprising:

determining a second set of pixels of the one or more filtered pixels is associated with a second polarized tag, the second polarized tag being on the subject of the motion capture, wherein:

the generating the motion capture pose for the model is further based at least in part on a second location of the second set of pixels of the one or more filtered pixels in the image.

12. The one or more non-transitory computer-readable media of claim 11, wherein:

the generating the motion capture pose for the model is further based at least in part on:

a first mapping of the first polarized tag with a first portion of a skeleton of the model; and a second mapping of the second polarized tag with a second portion of the skeleton of the model.

13. The one or more non-transitory computer-readable media of claim 9, the operations further comprising:

determining an identifier of the polarized tag based at least in part on the set of pixels of the one or more filtered pixels; and determining, based at least in part on the identifier and the location of the set of pixels of the one or more filtered pixels in the image, a location of a portion of a skeleton of the model, wherein:

the generating the motion capture pose for the model is further based at least in part on the location of the portion of the skeleton of the model.

14. The one or more non-transitory computer-readable media of claim 9, the operations further comprising:

determining an orientation of a portion of a skeleton of the model based at least in part on a mapping between the orientation of the polarized tag and the portion of the skeleton; and wherein the generating the motion capture pose is further based at least in part on the orientation of the portion of the skeleton.

15. A computer-implemented method comprising:

determining one or more filtered pixels having an associated degree of linear polarization above a threshold from a plurality of pixels of an image captured by a polarization camera;

determining a set of pixels of the one or more filtered pixels is associated with a polarized tag, the polarized tag being on a subject of motion capture;

determining an orientation of the polarized tag located on the subject of motion capture based at least in part on one or more angles of polarization of the set of pixels associated with the polarized tag; and generating a motion capture pose for a model based at least in part on a location of the set of pixels of the one or more filtered pixels in the image and the orientation of the polarized tag.

16. The computer-implemented method of claim 15, wherein determining the orientation of the polarized tag comprises:

determining a first angle of polarization of a first set of pixels of the set of pixels associated with a first portion of the polarized tag;

determining a second angle of polarization of a second set of pixels of the set of pixels associated with a second portion of the polarized tag; and determining the orientation of the polarized tag based at least in part on a position of the first set of pixels with respect to the second set of pixels.

17. The computer-implemented method of claim 15, wherein the polarized tag is a first polarized tag, the set of pixels is a first set of pixels, the method further comprising:

determining a second set of pixels of the one or more filtered pixels is associated with a second polarized tag, the second polarized tag being on the subject of the motion capture, wherein:

the generating the motion capture pose for the model is further based at least in part on a second location of the second set of pixels of the one or more filtered pixels in the image.

18. The computer-implemented method of claim 17, wherein the generating the motion capture pose for the model is further based at least in part on:

a first mapping of the first polarized tag with a first portion of a skeleton of the model; and a second mapping of the second polarized tag with a second portion of the skeleton of the model.

19. The computer-implemented method of claim 15, further comprising:

determining an identifier of the polarized tag based at least in part on the set of pixels of the one or more filtered pixels; and determining, based at least in part on the identifier and the location of the set of pixels of the one or more filtered pixels in the image, a location of a portion of a skeleton of the model, wherein:

the generating the motion capture pose for the model is further based at least in part on the location of the portion of the skeleton of the model.

20. The computer-implemented method of claim 15, further comprising:

determining an orientation of a portion of a skeleton of the model based at least in part on a mapping between the orientation of the polarized tag and the portion of the skeleton; and wherein the generating the motion capture pose is further based at least in part on the orientation of the portion of the skeleton.

\* \* \* \* \*